(12) United States Patent
Warner et al.

(10) Patent No.: US 8,248,981 B2
(45) Date of Patent: Aug. 21, 2012

(54) METHOD AND APPARATUS FOR LOW COST, LONG RANGE, POWER EFFICIENT, WIRELESS SYSTEM WITH ENHANCED FUNCTIONALITY

(75) Inventors: Robert Warner, Holmdel, NJ (US); James Wang, San Marino, CA (US); Jack Winters, Middletown, NJ (US)

(73) Assignee: Eigent Technologies, Inc., Holmdel, NJ (US)

( * ) Notice: Subject to any disclaimer, the term of this patent is extended or adjusted under 35 U.S.C. 154(b) by 350 days.

(21) Appl. No.: 12/691,165

(22) Filed: Jan. 21, 2010

(65) Prior Publication Data
US 2011/0176464 A1 Jul. 21, 2011

(51) Int. Cl.
*G08C 17/00* (2006.01)

(52) U.S. Cl. ........... 370/311; 455/343.1; 375/134

(58) Field of Classification Search ............ 370/311, 370/210, 235, 280, 336; 455/343.1, 525; 375/134
See application file for complete search history.

(56) References Cited

U.S. PATENT DOCUMENTS

| | | | | |
|---|---|---|---|---|
| 2006/0274641 A1* | 12/2006 | Grieco et al. | ........... | 370/210 |
| 2007/0213028 A1* | 9/2007 | Shohara et al. | ........... | 455/343.1 |
| 2008/0056133 A1* | 3/2008 | Deshpande et al. | ........... | 370/235 |
| 2009/0067389 A1* | 3/2009 | Lee et al. | ........... | 370/336 |
| 2010/0046585 A1* | 2/2010 | So et al. | ........... | 375/134 |
| 2010/0113086 A1* | 5/2010 | Chang et al. | ........... | 455/525 |
| 2010/0202327 A1* | 8/2010 | Mushkin et al. | ........... | 370/280 |

* cited by examiner

*Primary Examiner* — Albert T Chou
(74) *Attorney, Agent, or Firm* — Porzio, Bromberg & Newman, P.C.

(57) ABSTRACT

The present invention provides a method and system for establishing a highly mobile, long range secure wireless network with dynamic topologies and near full connectivity with acceptable latency using low cost, low power, compact and lightweight devices. One aspect of the system deals with a highly mobile network with dynamic network topologies and a time varying wireless medium that has neither absolute nor readily observable boundaries outside of which radio nodes are known to be unable to receive network frames, although the desirable open field boundary is 1 mile in radius from a base station node. A synchronous frequency hopping technique is used with mobile nodes that can become slave base station nodes to a master base station node to increase the effective range of the master base station without increasing the transmit power. Furthermore, the use of adjustable sleep times for the mobile nodes, as well as a novel clock calibration method, provides a substantial range increase with acceptable battery size and system latency.

24 Claims, 6 Drawing Sheets

| Preamble | | Header | | Payload | |
|---|---|---|---|---|---|
| Sync | Unique Word | Length/Rate | CRC | Data | CRC |
| 32 Bits | 16 Bits | 16 Bits | 8 Bits | n Bits | 16 Bits |

Beacon 95

| Sync | Unique Word | Header | Data | CRC |
|---|---|---|---|---|
| 32 Bits | 16 Bits | 24 Bits | n Bits | 16 Bits |

Mobile Node Packet 96

| Sync | Unique Word | Header | Data | CRC |
|---|---|---|---|---|
| 32 Bits | 16 Bits | 24 Bits | n Bits | 16 Bits |

Base Station Node ACK Packet 97

Fig. 7

METHOD AND APPARATUS FOR LOW COST, LONG RANGE, POWER EFFICIENT, WIRELESS SYSTEM WITH ENHANCED FUNCTIONALITY

BACKGROUND OF THE INVENTION

1. Field of the Invention

The present invention provides a system and apparatus for a low cost, long range, power efficient wireless system that provides identification and locational information.

2. Description of Related Art

The wireless Local Area Networks (LAN), based on the 802.11(a/b/g/n) standard, support short range communications between portable devices such as notebooks. The system design employs Time Division Duplex (TDD) and Orthogonal Frequency Division Multiplexing (OFDM) modulation that is optimized for high data throughput in an indoor fading environment. In order to fairly share the wireless medium among different devices, the network protocol tries to keep a single node from occupying the medium for a long period of time by limiting the lowest allowable signaling rate. Since the required signal-to-noise ratio for a given bandwidth is proportional to the signaling rate, the achievable communication range for a wireless LAN is limited.

Wide Area wireless Networks (WAN), such as cell phone networks, on the other hand, are optimized for a larger number of users and longer range. The system design employs either Frequency Division Duplexing (FDD) or Time Division Duplexing (TDD) and wideband Code Division Multiple Access (CDMA) or OFDM modulation to support a variety of services including high peak data traffic, continuous low rate voice traffic, continuous broadcast multimedia traffic, and short data bursts for paging messages. A cell phone base station with 40 watts of transmission power and an antenna at the top of a tower can provide a coverage area in excess of 2 miles in diameter. This long range communication is achieved primarily by the placement of the base station antenna at the top of the tower to overcome the signal loss due to building blockage. A typical cell phone battery can last for a few hours of continuous use and a week of stand-by time. The cell phone network also provides security against illegal access to the network and eavesdropping, but does not protect against unauthorized radiators within the band and/or jammers.

ZigBee is a specification based on the IEEE 802.15.4 standard for low cost, low power, wireless mesh networking. The targeted application is wireless control and monitoring. The low power usage of ZigBee devices allows a longer battery life and smaller batteries. The mesh networking attribute provides higher reliability and longer range. Because ZigBee can be activated (going from sleep to active mode) in 15 msec or less, the latency can be very low, and devices can be very responsive, particularly compared to Bluetooth, which has delays in waking up that are typically around three seconds. Since ZigBee is in sleep mode most of the time, its average power consumption can be very low, resulting in a longer battery life.

In beacon-enabled networks, special network nodes called ZigBee routers transmit periodic beacons to confirm their presence to other network nodes. Nodes sleep between beacons, thus lowering their duty cycle and extending their battery life. Beacon intervals range from 15.36 milliseconds to 3.287 seconds at 250 kbit/s, from 24 milliseconds to 5.136 seconds at 40 kbit/s and from 48 milliseconds to 10.272 seconds at 20 kbit/s. However, a low duty cycle operation with long beacon intervals requires precise timing, which is in direct conflict with the need for a low product cost. Alternatively, in non-beacon-enabled networks, an unslotted Carrier Sense Medium Access/Collision Avoidance (CSMA/CA) channel access mechanism can be used. In this type of network, ZigBee routers typically have their receiver continuously in the active mode, which requires a more robust power supply. However, this allows for a heterogeneous network in which some devices receive continuously, while others only transmit when an external stimulus is detected. Thus, longer battery life is achievable by one of two means: a continuous network connection and a slow but steady battery drain, or an intermittent connection and an even slower battery drain. To keep the power consumption requirements low in ZigBee devices, the expected range is from 10 to 70 meters.

For wireless systems that provide identification and location information, there is a need for security, long range, high mobility, and near full connectivity with acceptable latency using low cost, low power, compact and light weight devices.

SUMMARY OF THE INVENTION

The present invention provides a method and system for establishing a highly mobile, long range secure wireless network with dynamic topologies and near full connectivity with acceptable latency using low cost, low power, compact and lightweight devices. One aspect of the system provides a highly mobile network with dynamic network topologies and a time varying wireless medium that has neither absolute nor readily observable boundaries outside of which radio nodes are known to be unable to receive network frames. The desirable open field boundary of the system is about 1 mile in radius from the base station node. While boosting the transmit power can increase the transmission distance, it is also desirable to meet FCC requirements and maintain a low power, light weight, compact form factor which is portable or can be embedded into other devices, avoids an excessive heat dissipation requirement on the mobile node, and avoids the use of large battery. While a lower data rate can assist in providing increased range, it also increases the duration a medium is occupied. As a result, when the number of mobile nodes in the network increases, the system latency can increase to an unacceptable level. While most of the conventional networks emphasize increased capacity and data throughput, the present invention provides a range increase with acceptable battery size and system latency.

The present invention uses a low complexity, constant envelope modulation with a low data rate which is insensitive to the nonlinearity allowed for high efficiency amplifiers both in the transmitter and the receiver. The system employs a synchronized time slot frequency hopping technique, in which the base station node periodically transmits beacons and the mobile nodes are time synchronized to the base station node and hop with the same pseudo-random pattern. In order to reduce the system latency and power consumption, short packets, optimized to carry essential information but expandable to support other system functions, are employed for transmitting and receiving the system data. To deal with multipath and fading, the present invention employs both antenna diversity and the frequency (time) diversity. The frequency diversity is a result of the frequency hopping technique. This combination ensures that the longest range can be achieved with lowest power consumption.

In order to simplify the system processing complexity, the present invention employs a slotted time frame structure with two types of time slots. A "contention-access time" slot allows uncoordinated access to the network by the mobile nodes and an "allocated time" slot provides dedicated time slots to certain nodes which can communicate in a coordinated and an interference free fashion within the network. Such a frame structure maintains the simplicity of low power operation and low complexity random access by mobile nodes while, at the same time, supporting a number of advanced features such as capacity expansion, reduced latency, and range extension.

In the present invention, the mobile nodes acquire and synchronize to the base station beacons. To provide security to the system, the mobile nodes and the base station share a secret key. The mobile nodes retrieve the "state" of the hopping sequence from the beacons and, together with the secret key, locally generate a matched and synchronized hopping pattern. The mobile nodes enter into a power save state unless it is time for them to listen for the base station beacon or it is time for the mobile nodes to transmit. The mobile node does not need to listen to every base station beacon. The duration of the power save state can be controlled by assigning flags to the mobile nodes. By minimizing the duration of the wake state and the number of transmissions, a mobile node can conserve battery power. The present invention also provides for calibrating the clock of the mobile nodes for a longer power save state.

As the number of mobile nodes within the network increases, the present invention provides a technique of system capacity expansion by engaging additional base station nodes to deal with the increased traffic and increased system latency. An additional slave base station, with its clock synchronized to the master base station node, hops at a different frequency hopping pattern and can be used to divert some mobile node traffic from the master base station node in order to maintain the latency of the system and avoid excessive packet collisions. The system capacity expansion is a form of FDMA (frequency-division multiple access) since the additional slave base station uses a different frequency channel. To maintain time synchronization with the master base station node, the slave base stations listen to the master base station beacon. Additionally, the slave base stations are assigned a beacon transmission time which is offset from the master base station and other slave base stations. The master base station node and the slave base station nodes typically communicate at a higher data rate with each using designated (allocated) time slots to exchange information. Some mobile nodes with enhanced capability can be converted to act as slave base station nodes as needed. When the master base station is incapacitated or destroyed, the slave station can continue to operate on its own for a while until one of the slave stations can become the master station. This allows the system to survive without significant interruption and degradation in performance in the adverse situation.

The system of the present invention also controls the reporting period of mobile nodes by assigning them different flags. The flag is set as part of the mobile node profile but can also be overwritten by the base station. Depending on the requirements, mobile nodes that do not need to report to the base station frequently are assigned flags which have longer reporting periods. In this way, the base station can also control the amount of system traffic.

Another aspect of the present invention is to be robust against other signals which can be sharing the wireless medium or hostile interferers intentionally jamming the medium. The system employs the conventional CSMA/CA with random back-off to regulate the network traffic. When this technique is overlaid on the frequency hopping, the system has added robustness against other signals which can be sharing the wireless medium or hostile interferers intentionally jamming the medium. The system can deal with large or small numbers of mobile nodes by controlling the access back-off timer. When a large number of mobile nodes are in the system, the back-off time can be increased to reduce the number of packet collisions. This allows the system to maintain a constant throughput for the network.

Another aspect of the system of the present invention deals with the lack of full connectivity such that some nodes cannot hear other nodes within the same network. The system can extend its coverage by engaging slave base stations at the edge of coverage to capture more mobile nodes which are beyond the raw coverage of the master base station. A slave base station node can relay the information from hidden mobile nodes back to the master base station using designated time slots. A large number of base stations are allowed to simultaneously operate within an area without adversely interfering with each other to achieve full or near full connectivity of the mobile nodes and large system capacity with acceptable latency.

A feature of the present invention is that it uses the time, frequency, and space (geographic) domains to optimize its capacity. It also can adjust the "update" rate (latency) of the system to accommodate more nodes and higher traffic.

DETAILED DESCRIPTION

The present invention provides a low power, long range, secure, and fully mobile (base station and handset) radio network. The present invention achieves a long range while maintaining low power consumption. Other aspects of the invention deal with low network latency while accommodating a large number of mobile nodes and achieving full connectivity of the system. The present invention provides a method and system for establishing a highly mobile, long range, secure, wireless network with dynamic topologies, near full connectivity and acceptable latency using low cost, low power, compact and lightweight devices.

A UHF slow frequency hopping system with Minimum Shift Keying (MSK), Gaussian Minimum Shift Keying (GMSK), Frequency Shift Keying (FSK) or Staggered Quadrature Phase Shift Keying (SQPSK) types of constant envelope modulation schemes that can be demodulated with a simple receiver is used in the present invention. It is suitable for an implementation with a low cost microprocessor, such that a reasonable acquisition time (within a couple seconds) can be achieved. To achieve the goal, the base station starts a network by transmitting a beacon at selected intervals based on a selected frequency hopping pattern. The selected frequency hopping pattern uses a sequence generator with a secure seed that is shared among the base station and the mobile nodes. The base station beacon carries the state of the sequence generator in its beacon. The state, together with the seed, allows the mobile nodes to generate the same synchronized hopping sequence. A mobile node performs its initial hopping sequence acquisition by setting its receiver to a continuous receiving mode. It either stays in a frequency bin to wait for the base station signal or hops with a different pattern or period. After a short duration, the base station beacon will fall into the same frequency bin as the mobile node receiver. The mobile receiver then demodulates the signal, establishes the timing synchronization, and retrieves the state of the hopping sequence to establish the same hopping pattern thereafter.

In order to simplify the processing complexity, the present invention employs a simple slotted time frame structure with a duration established by two consecutive beacons. The beacon interval is broadcast as part of the beacon data and is generally static but can be adjusted for flexibility. Frequency hopping can be determined by changing a transmit frequency every dwell time slot of a frame and having an adjustable number of dwell time slots per frame. As illustrated in the FIG. 1, the beacon is the timing master which establishes the frame with an integer number of time slots. Beacon frame 10 contains two types of time slots, namely, contention-access time slots 11 and allocated time slots 12. Contention-access time slots 11 are used for transmission by mobile nodes using the Carrier Sense Multiple Access/Collision Avoidance (CSMA/CA) protocol. This allows mobile nodes to independently access the network without coordination with other mobile nodes. During contention based time slots 11, beacon 13 from the base station, and packets 14-22 are transmitted. Each packet 14-22 comprises Gap Time 23, packet 24 from a mobile node, and ACK/NAK 25 from the base station. The base station can also assign dedicated time slots for communication by specific nodes in allocated time slots 12 which are free from interference from other nodes. Allocated time slots 12 are specified in the beacon data by the base station with a certain offset from beacon packet 13 with the duration in units of time slots. Allocated time slots 12 can comprise packet 26 from another base station, and packets from mobile nodes plus ACK/NAKs 27-30.

Once initial acquisition is achieved, a mobile node can synchronize its timing according to the beacon and it initiates its power saving mode while maintaining network connectivity if the network does not require any active update of the mobile node information. The frequency hopping feature also allows the system to be robust against unintentional interferers or intentional jammers. This feature also allows multiple base stations to simultaneously access the network.

A constant envelope type of signal allows a transmitter to use a Class C type (or other highly efficient type) of amplifier to reduce peak and average power consumption and also allows a receiver to use high efficiency and high gain logarithmic amplifiers and low complexity signal processing to reduce power consumption. A simple demodulator reduces the receiver complexity. The operation of a high efficiency power amplifier in combination with the realization of a low power receiver achieves the highest efficiency in terms of DC power consumption for the amount of data transfer. Such features permit the use of a reasonable size battery, extend operational life (without battery recharge or replacement) and remove the requirement of a bulky heat sink.

Figure 2:
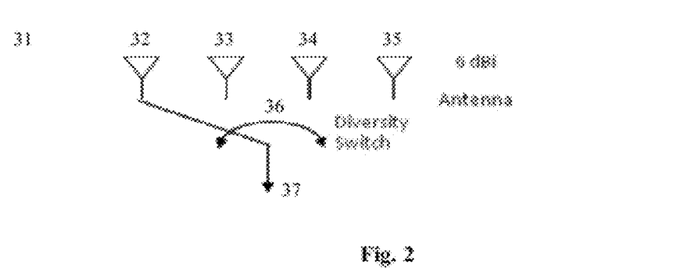
FIG. 2 is a schematic diagram of antenna selection diversity.

For wireless signal propagation, well-defined coverage areas simply do not exist. Propagation characteristics are dynamic and unpredictable. Small changes in position or direction may result in dramatic differences in signal strength. Similar effects occur whether a network node is stationary or mobile (as moving objects may impact station-to-station propagation). This type of phenomenon is called multipath fading, and the rate of fading is related to how fast the node moves and the medium changes. The present invention provides a combination of antenna diversity and frequency/time diversity techniques which retain a compact, low cost, and low power design. In one embodiment, antenna diversity is provided by using patch antenna elements with switched selection capability, which is illustrated in FIG. 2. Switched diversity system 31 comprises antenna elements 32-35 and diversity switch 36 which selects which one of antenna elements 32-35 to connect to output 37. The use of frequency hopping provides frequency and time diversity through the re-transmission of signal packets at different frequency bins and time slots.

To deal with a large number of network nodes, the system employs short packets for signaling such that each node does not occupy significant time. Once initial acquisition is achieved, the mobile nodes enter into a power saving state unless it is time to listen for the base station beacon or it is time for a mobile node to transmit. The mobile node does not need to listen to every base station beacon. The duration of the power saving state can be controlled by assigning flags to the mobile nodes. The flag is generally set in the mobile node based on its user profile but can be overwritten by the base station based on network usage. This initial flag assignment is established when the mobile node first associates with the base station based on the profile of the mobile station in the association request. By minimizing the duration of the wake state and the number of transmissions, a mobile node can conserve battery power. If the base station requires more or less frequent updates of the mobile node information, it can send a command to change the flag of the mobile node. This has the effect of lengthening or shortening the power save state duration. A most frequent update can be to require the mobile node to listen for a beacon every frame and respond as soon as possible to a query from the base station.

The power consumption of a mobile node is predominately determined by the duration it needs to listen to the beacon and transmit a packet. In the power saving state, a mobile node can shut off unnecessary operations while maintaining a sleep timer running at a low clock rate. The sleep timer is pre-set to wake up the mobile node after a number of clock cycles in order to receive a beacon. The longer the sleep time is, the larger the clock offset and the drift-induced timing offset. The mobile node can wake up ahead of the beacon to accommodate the clock drift induced offset. The precise clock drift can be calibrated with the actual beacon time established at the reception of frame sync in the beacon. By calibrating the clock offset and drift with the beacon timing over a short duration, the induced timing offset can be reduced and the wake up instant can be improved. The resolution of the calibration can be improved using multiple sleep clocks, a slow clock for the bulk of the sleep duration and a faster clock as the wake up time approaches to provide better resolution for timing calibration. If the relative position and velocity of the mobile node and the base station are known, the motion-induced Doppler can be removed in the calibration process to improve the accuracy of the estimate. If the carrier frequency and the sleep timer are locked to the same clock, the carrier frequency offset estimation and calibration information can be used to correct for the clock offset as well.

Figure 3:
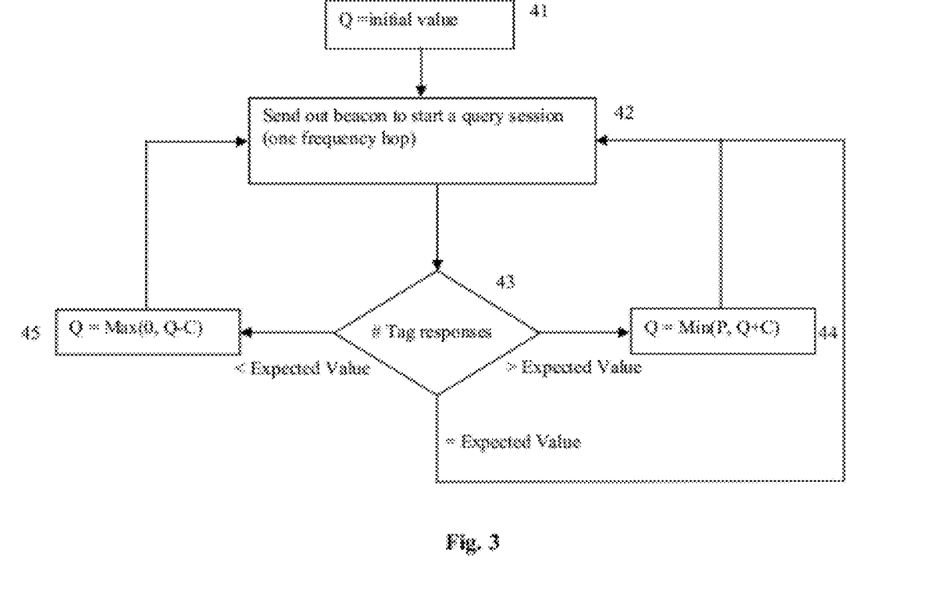
FIG. 3 is a schematic diagram of a flow chart of a Q-factor adjustment algorithm.

From the network perspective, the amount of traffic within the network can affect the rate of collisions among mobile nodes and consequently the throughput of the system and the power consumption at the mobile nodes (due to retransmissions). A dynamically adjusted Q factor masking scheme can be employed to optimize the random back-off time of nodes. This allows the network to settle into a good balance between network capacity and latency. Depending on the number of tag responses successfully received, the Q factor is dynamically adjusted to accommodate the network loading, thereby controlling the overall packet collision rate and reducing the retransmission of packets which leads to a lower power consumption at the mobile nodes. An embodiment of Q adjustment is illustrated in flow chart 40, shown in FIG. 3. In initial step 41, the back-off time for each node is selected by a random number generator within the range from 0 to $2^{Q-1}$. Specifically, in step 42, the base station sends out a beacon to start a query session. In step 43, the base station determines the number of tag responses. If the number of tag responses is equal to the expected number, Q is kept as is for the next query session in step 42. If the number of tag responses is less than the expected value, Q is decreased by a predetermined amount C, and is kept nonnegative, in step 45 for the next query session in step 42. If the number of tag responses is greater than the expected value, Q is increased by a predetermined amount C, and upper bounded by a predetermined maximum number P, in step 45 for the next query session in step 42.

Figure 4:
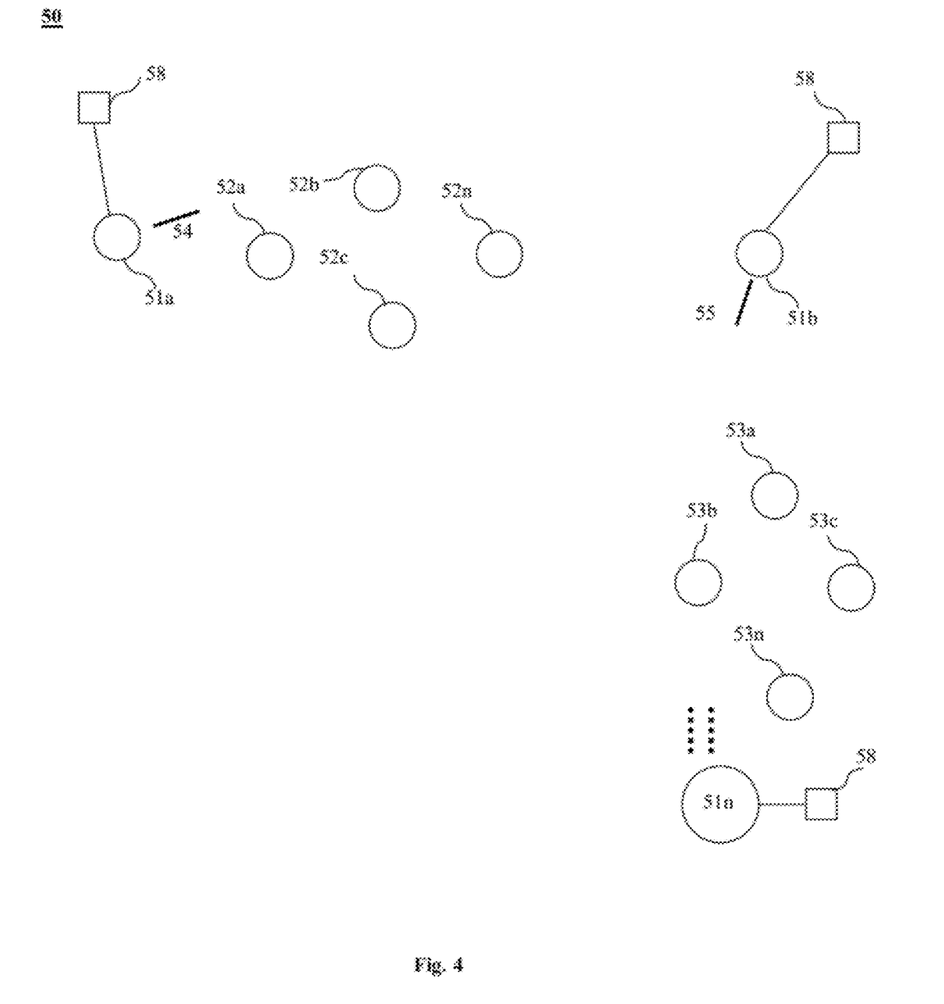
FIG. 4 is a schematic diagram of a wireless network for identification and location of mobile nodes.

FIG. 4 illustrates a wireless network system 50 for identification and location of mobile nodes by a base station. There are two types of nodes, base station nodes 51a-51n and mobile nodes 52a-52n. In one embodiment, at least one of mobile nodes 52a-52n is at least 350 meters from a respective base station node 51a-51n. Only one of base stations 51a is the master base station node of system 50 providing the timing information for all nodes 52a-52n within the network. All the other base stations 51b-51n are slave base stations. Slave base stations 51b-51n synchronize their timing to master base station 51a while they hop with different hopping patterns from master base station 51a. Slave base stations 51b-51n broadcast their own beacons and have their own network of mobile nodes 53a-53n. Mobile nodes 52a-52n and 53a-53n with enhanced capability can also act as base stations.

Figure 1:
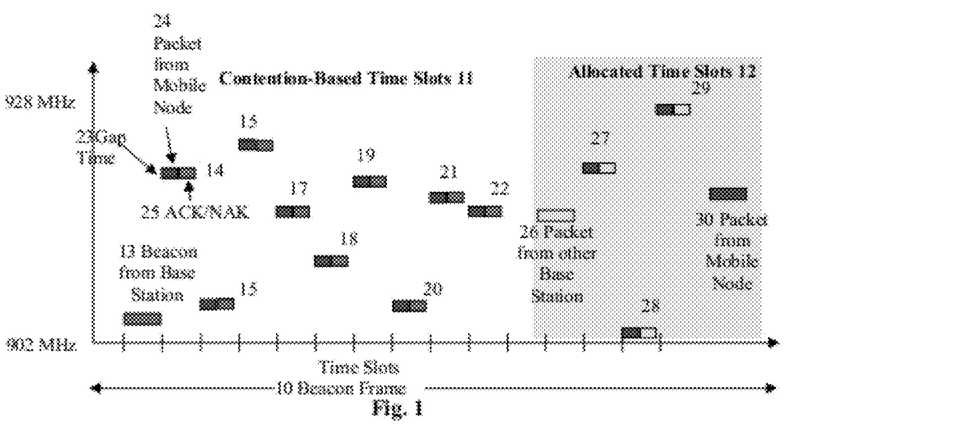
FIG. 1 is a schematic diagram of frequency/time slots within a session.

The present invention provides an approach for multiple base stations 51a-51n to operate simultaneously and efficiently in proximity without causing interference to each other. Master base station 51a can establish a frequency hopping network in an area by periodically sending out beacons 54. Slave base stations 51b-51n can operate in proximity by first establishing timing synchronization with master base station 51a. To maintain coordination with the original master base station 51a, slave base stations 51b-51n reserve allocated time slots for the beacon transmission time of the master base station to prevent the mobile nodes from interfering with the beacon of the master station, as shown in FIG. 1. By listening to beacons 54 of master base station 51a beacon, slave base stations 51b-51n can maintain their synchronization to master base station 51a. Thus, the network timing of the slave network remains synchronized to the original master network. The beacon transmission maintains the network timing and operation. It is desirable to offset the beacon transmission time between the base stations to avoid collision of the beacons. Master base station 51a can coordinate (assign) the beacon transmission times of slave base stations 51b-51n. Slave base stations 51b-51n have their own hopping patterns. These hopping patterns can either be mutually exclusive sets or have minimized probabilities of collision. The mutually exclusive set of hopping patterns can be achieved by using orthogonal hopping patterns. The orthogonal hopping patterns are employed when it is desirable to operate the system at or near its full capacity, but it places some constraints on the generation of the hopping sequence. For a lightly loaded network, i.e., the number of base stations in operation is a small fraction of the number of available frequency bins (channels) within the operational band, highly randomized hopping sequences can be adequate to reduce the number of collisions. In an alternate embodiment, more secure hopping sequences can be used. For example, slave base stations 51b-51n broadcast beacons 55 to allow mobile nodes 53a-53n to synchronize to them and establish their own networks. Slave base stations 51b-51n are able to establish database 58 of the mobile node locations and the associated time tags. Slave base stations 51b-51n can identify themselves to master base station 51a by sending packets back to master base station 51a in the same way as mobile nodes 52a-52n to identify their profile to master base station 51a.

Mobile nodes 52a-52n and 53a-53n can include a receiver and transmitter. In one embodiment, mobile nodes 52a-52n are tags. Slave base stations 51b-51n partition their time slots within a beacon period into two groups: contention access time slots 11 to allow mobile nodes to use the CSMA/CA scheme to respond; and allocated time slots 12 to allow slave base stations 51b-51n to communicate with master base station 51a for exchanging information, as shown in FIG. 1. To communicate with master base station 51a, slave base stations 51b-51n use the contention access time slots to send a packet requesting master base station 51a to assign allocated time slots for dedicated communication. Such request packets carry a request with a certain time slot offset and duration from beacon 54 of master base station 51a. Upon receiving a grant from master base station 51a, respective slave base stations 51b-51n can start signaling to master base station 51a during the allocated time slots.

Slave base stations 51b-51n can communicate information they have received from mobile nodes 53a-53n to master base station 51a and can receive information about missing mobile nodes from master base station 51a. By periodically exchanging such information, all base stations can share information about the locations of the mobile nodes. A new network established by the slave base station basically co-exists with the original master network without interference between the two networks. The two base stations can talk to one another and exchange information by using the allocated time slots. It is desirable to select nodes at strategically diverse locations to become the slave base stations to minimize collisions within the network. Some nodes with base station capability, but within proximity of another active base station, can simply join the network as a mobile node instead of acting as another base station. It can obtain the network database by downloading such information from the associated base station using the contention-free "allocated" time slot. This allows the overall system to remain stable and reasonably loaded while accommodating a large number of nodes with different requirements. The present invention distributes the traffic load and information among the nodes in a method utilizing the time, frequency, and space (geographic) domains intelligently and by adjusting the update rate (latency) of the system in a secure way.

The master base station differs from other base stations in two aspects: the master base station serves as the timing master for the network and the master base station serves as the information aggregator for the other base stations. Since the information is exchanged among the base stations, the system databases are duplicated among the base stations. If the master base station becomes non-operational for some reason, the overall network can continue to operate for a while without a master base station. The mobile nodes belonging to a non-operational master base station will automatically acquire one of the other base stations. The slave base stations will contend for the status as the master base station by transmitting at the same beacon time slot as the original master base station. If no collision occurs, the base station that succeeds in transmitting at that master base station slot will become the master station. If a collision occurs, the two or more base stations will back off a random number of hops before another attempt is made unless another base station acquires the status as master base station before that attempt. It is possible to give more capable stations a high probability of becoming the new master base station by giving them a lower (or zero) back off timer. This can be controlled by the original master base station by assigning different flags to the other base stations. Once one slave station becomes the new master base station, it immediately uses the allocated time slot for its original beacon in which it broadcasts to its mobile nodes to tell the mobile nodes the new beacon time slot to which they should switch. With this protocol, network survival is ensured.

Figure 5:
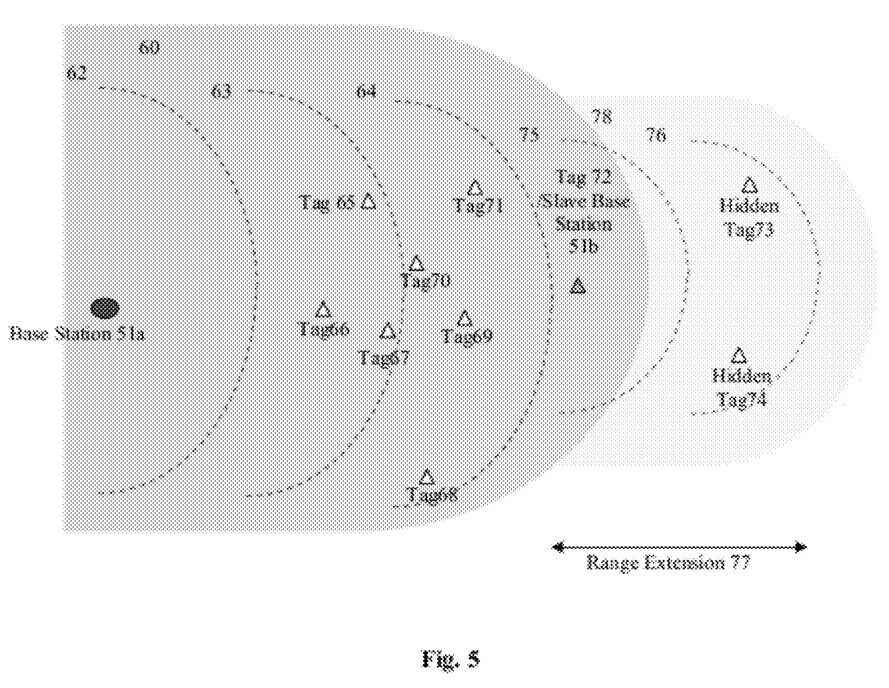
FIG. 5 is a schematic diagram of the extension of the coverage area by the use of a slave base station.

If the slave base station is on the edge of the master base station coverage area and it can establish a communication link with the master base station, the network can extend its coverage area using the information exchange between the two base stations, as illustrated in FIG. 5. By using additional base stations as slave base stations, the network can distribute the mobile nodes among the base stations. The base station distributes the mobile nodes to another base station by sending a command to selected mobile nodes. This way the overall system latency can be maintained since each base station only handles a limited number of mobile nodes. As shown in FIG. 5, coverage area 60 is provided by base station 51a. Various coverage ranges, 62-64, are provided by base station 51a, with range 63 covering tags 65 to 67, and range 64 covering tags 68 to 71. Tag 72 is still covered by base station 51a, although it is farther than range 64. Tags 73 and 74 are hidden from base station 51a as they are outside its coverage area 60. However, if tag 72 becomes a slave base station 51b, its various ranges 75 and 76 can cover hidden tags 73 and 74, since range 76 covers these tags. Thus, the range of base station 51a has been extended with range extension 77 since it now includes the coverage area 78 of the slave base station 51b.

It is desirable to have base stations at geographically diverse locations to reduce the rate of collisions within the system by taking advantage of the signal propagation loss at longer ranges as is conventionally used in a wide area cell phone system. Due to the full mobility of the system of the present invention, fixed location base stations are not fixed at strategic locations. In the present invention, the master base can regulate the establishment of slave base stations utilizing their locational information during the association process and control the "granting" of the slave base station status. Nodes that want to obtain system database 58, shown in FIG. 4, but are not granted base station status can act as mobile node to another base station and can request a download of system database 58 from the selected base station by using the contention-free allocated time slots, as shown in FIG. 1.

In order to improve the power management process, mobile nodes can have their profiles represented by flags. Typically, the profile of a mobile node is pre-programmed and stored in the mobile node. A base station can also assign a flag to a mobile node and can issue a command addressed to a certain flag only. One benefit of grouping mobile nodes by flags is that commands can be addressed to mobile nodes with a specific flag. For example, mobile nodes that require less frequent updates are assigned a flag that indicates a longer duration power save mode. Mobile nodes that require more frequent updates are assigned a different flag corresponding to shorter duration power save mode. For a longer power save mode, the mobile nodes can skip several beacons before waking up. Thereby they conserve power and allow the network to be less congested. The use of multiple flags simultaneously can create a union or intersection of mobile nodes belonging to different groups.

Figure 6:
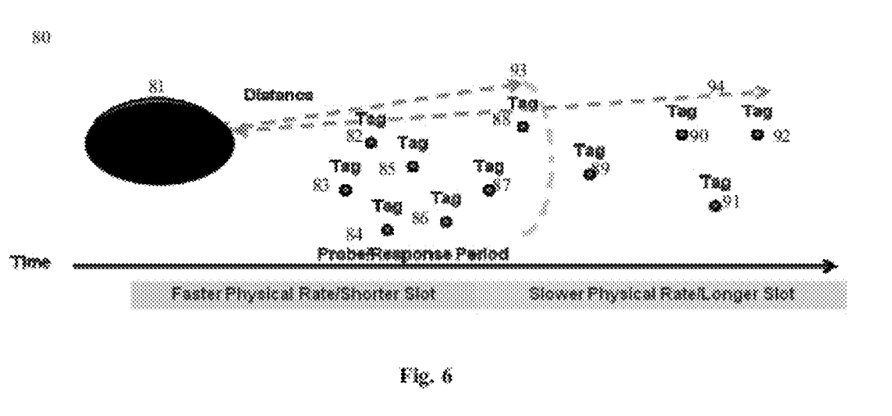
FIG. 6 is a schematic diagram of the use of rate adaptation.

FIG. 6 illustrates the concept of rate adaptation. The rate adaptation is typically applied to communication using allocated time slots only. Since contention-based time slots 11 are typically used to deal with short packets with small amounts of data, rate adaptation generally does not apply to these time slots. For allocated time slots 12 with large amounts of data to be transferred between nodes, it is more efficient to adapt to the highest possible data rate based on the relative received signal to noise level. The two nodes involved first exchange short signaling packets to establish the handshake for an agreed upon data rate within allocated time slot 12. This handshake can be accomplished with the initiation node requesting a link report, which can include link margin, from the responding node, and the initiation node making a decision of which rate to use. Alternatively, the responding node can send a recommended rate to the initiation node, and the initiation node can "accept" or "reject" the recommendation. Once the rate decision is made, the new rate is employed and signaled in the packet header of the next message that is sent. Once the handshake is established, the information is exchanged at the agreed upon data rate for faster transfer. This information exchange must be stopped before the end of an allocated time slot.

FIG. 6 shows a communication network 80 that comprises base station 81 that is communicating with tags 82 to 92. Tags 82 to 88 are within distance 93 of base station 81, and therefore have a high signal to noise ratio and can operate at a high data rate. A faster physical rate results in a shorter slot for the same information to be transmitted than for tags at a greater distance. Tags 89 to 92 are located at a range greater than distance 93, but less than distance 94 from base station 81, and therefore have a lower signal to noise ratio and operate at a lower data rate. A slower physical rate results in a longer slot for the same information to be transmitted.

Figure 7:
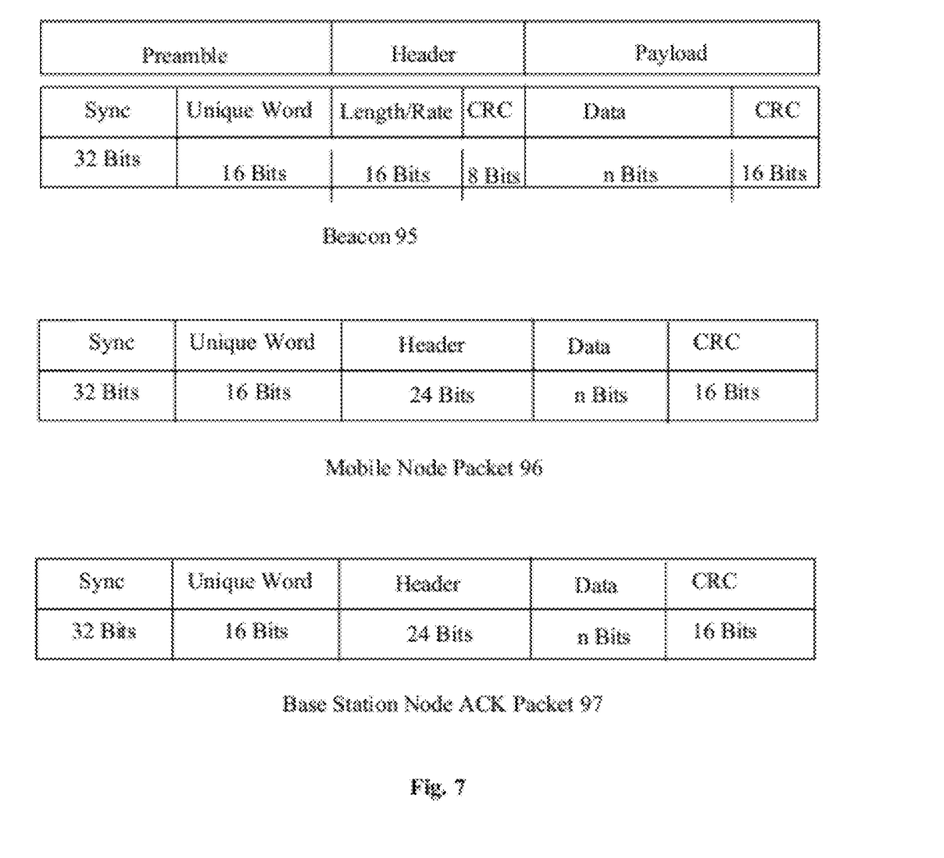
FIG. 7 is a schematic diagram of one embodiment of a packet structure.

FIG. 7 illustrates a typical packet structure for base station beacon packet 95, the mobile node response packet 96, and base station acknowledgement (ACK) packet 97. Base station beacon packet 95 design is optimized to save power for the mobile nodes while supporting other functions of the system. Base station beacon packet 95 comprises a preamble, which contains, for example, a 0,1,0,1 pattern and a frame sync (unique word or start frame delimiter) to allow the mobile nodes to establish receiver signal acquisition and synchronization. Following the preamble, the packet header contains information on the length of the packet and the signaling rate of the payload and the associated header CRC. The header information is the essential information for all the nodes within the system to determine the duration of the packet transmission and to avoid packet collisions. This is the essential part of CSMA/CA. The last part of the beacon carries payload information such as commands, requests, responses, allocated time slots, the hopping state, and other unicast or broadcast information.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A wireless network for identification and location of mobile nodes by a base station comprising:

beacons transmitted periodically by the base station to the mobile nodes, the beacons being based on a frequency hopping pattern; and means for generating the same frequency hopping pattern at the mobile nodes from the received frequency hopping pattern for time synchronizing the base station and the mobile nodes and establishing connectivity, the mobile nodes transmitting the identification and location to the base station;

the mobile nodes including a power saving mode for saving power at the mobile nodes while maintaining the connectivity with the network; and at least one slave node wherein the at least one slave node is time synchronized to the base station and the at least one slave node communicates with other of the mobiles nodes.

2. The network of claim 1 wherein the power saving mode includes a sleep mode and an active mode, in the sleep mode the mobile nodes sleep for an interval of a predetermined number of the beacons before entering the active mode, the interval being controlled by a flag at the mobile node.

3. The network of claim 1 further comprising a clock at the mobile nodes wherein the clock operates at a slow rate when in the sleep mode until within a given short interval before the active mode when the clock rate is increased.

4. The network of claim 1 wherein the frequency hopping is determined by changing a transmit frequency every dwell time slot of a frame and having an adjustable number of dwell time slots per frame.

5. The network of claim 4, wherein the frame comprises contention-based time-slots and allocated time slots.

6. The network of claim 1 wherein the mobile nodes comprise multiple antennas with switched or selection diversity.

7. The network of claim 1 wherein at least one mobile node is at least 350 meters from the base station.

8. The network of claim 1 wherein the identification and location is transmitted by a constant envelope modulation to the base station.

9. The network of claim 1 further comprising means for the base station to select the slave nodes to be located geographically diverse.

10. The network of claim 1 wherein the slave node is synchronized to the base station with an offset beacon transmission time.

11. The network of claim 1 further comprising means for the slave node to replace the base station if the base station becomes incapacitated.

12. The network of claim 1 further comprising means for the base station to adjust a back-off timer at the base station based on a number of responses received from the mobile nodes, thereby reducing collisions in the network based on network traffic.

13. A method for identification and location of mobile nodes by a base station comprising the steps of:

transmitting beacons periodically by the base station to the mobile nodes, the beacons being based on a frequency hopping pattern;

establishing at least one slave node, the at least one slave node is time synchronized to the base station and communicates with other of the mobile nodes;

generating the same frequency hopping pattern at the mobile nodes from the received frequency hopping pattern for time synchronizing the base station and the mobile nodes and establishing connectivity in a network, the mobile nodes transmitting data of the identification and location to the base station using the frequency hoping pattern; and operating the mobile nodes with a power saving mode for saving power at the mobile nodes while maintaining the connectivity with the network.

14. The method of claim 13 wherein the power saving mode includes a sleep mode and an active mode, in the sleep mode the mobile nodes sleep for an interval of a predetermined number of the beacons before entering the active mode, the interval being controlled by a flag at the mobile node.

15. The method of claim 14 further comprising the step of operating the mobile nodes with a clock wherein the clock operates at a slow rate when in the sleep mode until within a given short interval before the active mode when the clock rate is increased.

16. The method of claim 13 wherein said step of transmitting data using synchronous frequency hopping pattern further comprises changing transmit frequency every dwell time slot of a frame with an adjustable number of dwell time slots per frame.

17. The method of claim 16, wherein the dwell time slot comprises contention-based time-slots and allocated time slots.

18. The method of claim 13 further comprising the step of changing a transmit or receive antenna at the mobile nodes with switched or selection diversity.

19. The method of claim 13 wherein at least one mobile node is at least 350 meters from the base station.

20. The method of claim 13 wherein the step of transmitting data further comprises the use of a constant envelope modulation.

21. The method of claim 13 wherein the base station selects the slave nodes to be located geographically diverse.

22. The method of claim 13 wherein the slave node is synchronized to the base station with an offset beacon transmission time.

23. The method of claim 13 further comprising the step of the slave node replacing the base station if the base station becomes incapacitated.

24. The method of claim 13 further comprising the step of the base station adjusting a back-off timer at the base station based on a number of responses received from the mobile nodes, thereby reducing collisions in the network based on network traffic.

* * * * *